(12) United States Patent
Flank et al.

(10) Patent No.: US 7,177,879 B2
(45) Date of Patent: Feb. 13, 2007

(54) METHOD AND APPARATUS FOR DIGITAL MEDIA MANAGEMENT, RETRIEVAL, AND COLLABORATION

(75) Inventors: Sharon Flank, Vienna, VA (US); Keith Simonsen, Washington, DC (US); Robert Griffin, Vienna, VA (US)

(73) Assignee: Corbis Digital Asset Management Services, LLC, Seattle, WA (US)

( * ) Notice: Subject to any disclaimer, the term of this patent is extended or adjusted under 35 U.S.C. 154(b) by 782 days.

(21) Appl. No.: 10/063,410

(22) Filed: Apr. 21, 2002

(65) Prior Publication Data

US 2002/0194198 A1    Dec. 19, 2002

Related U.S. Application Data

(60) Division of application No. 10/063,409, filed on Apr. 21, 2002, now Pat. No. 6,922,691, which is a continuation of application No. PCT/US01/26841, filed on Aug. 28, 2001.

(60) Provisional application No. 60/228,837, filed on Aug. 28, 2000.

(51) Int. Cl.
   *G06F 7/00*    (2006.01)
   *G06F 17/00*   (2006.01)
   *G06K 9/00*    (2006.01)

(52) U.S. Cl. .................. 707/104.1; 382/126; 715/526

(58) Field of Classification Search ................. 382/126; 715/526
   See application file for complete search history.

(56) References Cited

U.S. PATENT DOCUMENTS

| | | | |
|---|---|---|---|
| 5,532,839 A * | 7/1996 | Beikirch et al. ............ | 358/401 |
| 5,600,775 A | 2/1997 | King et al. | |
| 5,682,487 A * | 10/1997 | Thomson ..................... | 715/800 |
| 5,721,902 A | 2/1998 | Schultz | |
| 5,752,244 A | 5/1998 | Rose et al. | |
| 5,850,561 A | 12/1998 | Church et al. | |
| 5,864,845 A | 1/1999 | Voorhees et al. | |
| 5,938,724 A | 8/1999 | Pommier et al. | |
| 5,983,237 A | 11/1999 | Jain et al. | |
| 5,987,459 A * | 11/1999 | Swanson et al. ............... | 707/6 |
| 6,006,241 A | 12/1999 | Purnaveja et al. | |
| 6,038,333 A * | 3/2000 | Wang ......................... | 382/118 |
| 6,072,904 A | 6/2000 | Desai et al. | |

(Continued)

FOREIGN PATENT DOCUMENTS

WO   WO 02/19147    3/2002

*Primary Examiner*—Jeffrey Gaffin
*Assistant Examiner*—Cindy Nguyen
(74) *Attorney, Agent, or Firm*—Darby & Darby PC; Jamie L. Wiegand

(57) ABSTRACT

The software according to the invention incorporates a glossary management tool that makes it easy for each client to customize terminology to the needs of a particular business. With this tool, termed a glossary manager, a company can customize a number of feature names in the system to provide a more familiar context for their users. A system administrator can also customize the manner in which "thumbnail" or "preview" images are presented. The system performs clustering on search queries, and searches media records multi-modally, using two or more approaches such as image searching and text searching. An administrator can tune search parameters. Two or more streams of metadata may be aligned and correlated with a media file, facilitating later searching. The system evaluates itself. It folds popularity information into rankings of search results.

11 Claims, 4 Drawing Sheets

Questions Associated with RUP 129

| Question Id | Question | Distributes Over | Role |
|---|---|---|---|
| 106 | new question2 | Groups ▼ | Modifier ▼ |

U.S. PATENT DOCUMENTS

| | | | |
|---|---|---|---|
| 6,546,405 B2 * | 4/2003 | Gupta et al. | 715/512 |
| 6,578,072 B2 * | 6/2003 | Watanabe et al. | 709/217 |
| 6,578,073 B1 * | 6/2003 | Starnes et al. | 709/219 |
| 6,834,130 B1 * | 12/2004 | Niikawa et al. | 382/305 |
| 6,868,192 B2 * | 3/2005 | Takiguchi | 382/299 |
| 6,871,009 B1 * | 3/2005 | Suzuki | 386/95 |
| 6,920,610 B1 * | 7/2005 | Lawton et al. | 715/526 |
| 6,944,340 B1 * | 9/2005 | Shah | 382/187 |
| 2002/0000998 A1 * | 1/2002 | Scott et al. | 345/667 |

* cited by examiner

Questions Associated with RUP 129

| Question Id | Question | Distributes Over | Role |
|---|---|---|---|
| 106 | new question2 | Groups ▼ | Modifier ▼ |

FIG. 1

Adjust the Search Engine

| Field | |
|---|---|
| Update filters | ? |
| Search filters | ? |
| | |
| Sense Weight Function | ? |
| Early Stress Function | ? |
| Multiword Function | ? |
| Default minimum score | ? |
| Exact-match scale | ? |
| Root word scale | ? |
| Noun phrase scale | ? |
| Head noun scale | ? |
| Modifier scale | ? |
| Minimum tag weight | ? |
| Minimum static tag weight | ? |
| Minimum storage weight | ? |
| Gerund Verb Weight | ? |
| Gerund Noun Weight | ? |
| Minimum Tag Weight for Patterns | ? |
| Location expansion weight | ? |
| Stop Words | ? |
| Stop Tags | ? |

| Part of Speech | Search Function | Update Function | ? |
|---|---|---|---|
| Antonym | | | |
| Hypernym | | | |
| Hyponym | | | |
| Member Meronym | | | |
| Substance Meronym | | | |
| Part Meronym | | | |
| Member Holonym | | | |
| Substance Holonym | | | |
| Part Holonym | | | |
| Attribute | | | |
| Entailment | | | |
| Cause | | | |
| Also See | | | |
| Verb Group | | | |
| Similar To | | | |
| Participle | | | |
| Pertainym | | | |

[Update]

Sample Phrase [                    ]   ○ Search
Scan for ID [      ]                    ○ Update

[Update]

FIG. 3

| Timecode | Closed Caption | Description | Face Library Candidate |
|---|---|---|---|
| 0:001:002-007 | former president *Clinton* | ex-president Bill Clinton | Bill Clinton |
| 0:003:001-008 | *George W. Bush's Secretary of State Colin Powell* | *Colin Powell,* Secretary of State for *George W. Bush* | Colin Powell George W. Bush |

METHOD AND APPARATUS FOR DIGITAL MEDIA MANAGEMENT, RETRIEVAL, AND COLLABORATION

CROSS REFERENCE TO RELATED APPLICATIONS

This application is a divisional of U.S. application Ser. No. 10/063,409, filed Apr. 21, 2002 now U.S. Pat. No. 6,922,691, which is a continuation of international application number PCT/US01/26841 designating the United States, filed Aug. 28, 2001, incorporated herein by reference, which claims priority from U.S. application Ser. No. 60/228, 837, filed Aug. 28, 2000, now expired, incorporated herein by reference.

BACKGROUND OF INVENTION

Creative designers in various fields work with materials from many different sources when they develop an advertisement, film, brochure, or other finished product. These materials may have been created originally by the creative designer, but for a different project, and stored in a media library or archive for later reuse. They may have been created by colleagues, and stored in an area that allows different individuals to collaborate on materials. Or they may have been created by professional artists for licensing or sale. These materials are often called rich media files, or assets. Rich media files may include, but are not limited to, video, photography, graphics, audio, mixed media files, logos, presentations, and text. These media files can exist in the widest possible range of formats. It is a ponderous task to manage such assets. Annotation mechanisms for such assets include the system described in U.S. Pat. No. 5,493, 677, assigned to the same assignee as the assignee of the present invention. Systems to manage such assets include that described in U.S. Pat. No. 6,012,068.

It would be desirable to have a management system for digital media which streamlines the task of accounting for rights to use such media, including copyright rights. Systems relating to rights management include those described in U.S. Pat. Nos. 4,337,483, 5,201,047, 5,260,999, 5,263,158, 5,319,705, 5,438,508, 5,629,980, 5,765,152, and 5,553,143.

Users in different businesses may use different terminology to refer to the various media management functions. For example, some may use the term library, while others use archive. Some may use project workspace, while others use share or collaboration tool. In many systems, changing terminology requires tedious programming effort which risks introducing errors into the software. It would be desirable to have a management system that conveniently permits non-technical users to customize such terminology on a per-system basis. U.S. Pat. No. 5,850,561 describes a glossary construction tool for creating glossary from text.

Different companies using the software according to the invention may have different corporate culture, image, and system context within the company. It would be desirable to have a management system that conveniently permits non-technical users to customize the software on a per-system basis with respect to such corporate concerns.

In a typical asset management system, users browse through media file collections and view thumbnail images of files to decide which files they want to work with. These thumbnails are browseables, or small representations of the actual images, videos, or other media files in the system. A browseable is created by optimizing an image or video frame for online browsing, so a browseable has lower resolution and smaller dimensions than the original file. It is commonplace, however, to find that the resolution and dimensions are not well suited to the company. It would be desirable to have a management system that conveniently permits a system administrator to customize the software in this respect.

Natural language processing (NLP) techniques are well known, including their use in information retrieval applications (Strzalkowski, 1993), (Strzalkowski, Perez Carballo and Marinescu, 1995), (Evans and Zhai, 1996). Past systems have attempted to improve upon vocabulary management techniques, for example as described in U.S. Pat. Nos. 5,251,316 and 6,125,236. Past approaches for searching multimedia include U.S. Pat. Nos. 6,243,713 and 5,794,249.

Clustering is well known, for example in U.S. Pat. Nos. 5,317,507, 5,758,257, 5,675,819, 5,778,362, and 5,875,446. See also Buckley, Chris, J. Walz, M. Mitra and C. Cardie, "Using Clustering and Super Concepts within SMART: TREC 6" (http://trec.nist.gov/pubs/trec6/t6_proceedings.html); Zamir, Oren, O. Etzioni, Madani, and Karp, KDD "Fast And Intuitive Clustering Of Web Documents;" and Koller, Daphne, and Mehran Sahami, ML "Hierarchically Classifying Documents Using Very Few Words." Rankings relating to relevance are discussed in U.S. Pat. No. 5,642,502.

The evaluation of information retrieval systems became an essential part of the field in the early '90s, and was strongly advanced by the TREC evaluations designed at NIST beginning in 1993. The TREC evaluation contains different tracks, but the tracks all share the following common features:

They are designed to provide a comparative evaluation between different systems, usually provided by different participants.

The evaluation is done using strict test conditions that contain a set of queries, a collection of documents, and relevance judgements.

The evaluations use evaluation scores such as precision and recall that supposedly predict real users' satisfaction from a system.

While these evaluations are indeed helpful in comparing the performance of different IR systems, they do not provide constant feedback on the performance of a live IR system. The base performance of an IR system could be at first evaluated using a standard measurement such as the one above, but as more media files are added to a system and users submit queries in an uncontrolled manner, it is hard to predict or estimate the performance of the system. In addition, if the system does not fall into the initial TREC evaluation tracks, it is necessary to develop an independent test case —a very costly task. It is desirable to have a better self-evaluation system for such a digital asset manager.

Known annotation-related systems are discussed in U.S. Pat. Nos. 5,600,775, 6,006,241, and 5,938,724.

SUMMARY OF INVENTION

The software according to the invention incorporates a glossary management tool that makes it easy for each client to customize terminology to the needs of a particular business. With this tool, termed a glossary manager, a company can customize a number of feature names in the system to provide a more familiar context for their users. A system administrator can also customize the manner in which "thumbnail" or "preview" images are presented. The system performs clustering on search queries, and searches media records multi-modally, using two or more approaches such as image searching and text searching. An administrator can tune search parameters. Two or more streams of metadata may be aligned and correlated with a media file, facilitating later searching. The system evaluates itself. It folds popularity information into rankings of search results.

BRIEF DESCRIPTION OF DRAWINGS

The invention will be described with respect to a drawing in several figures, of which:

FIG. 1 shows a typical rights management editor interaction;

FIG. 3 shows a screen permitting customers to adjust search parameters;

DETAILED DESCRIPTION

Figure 2:
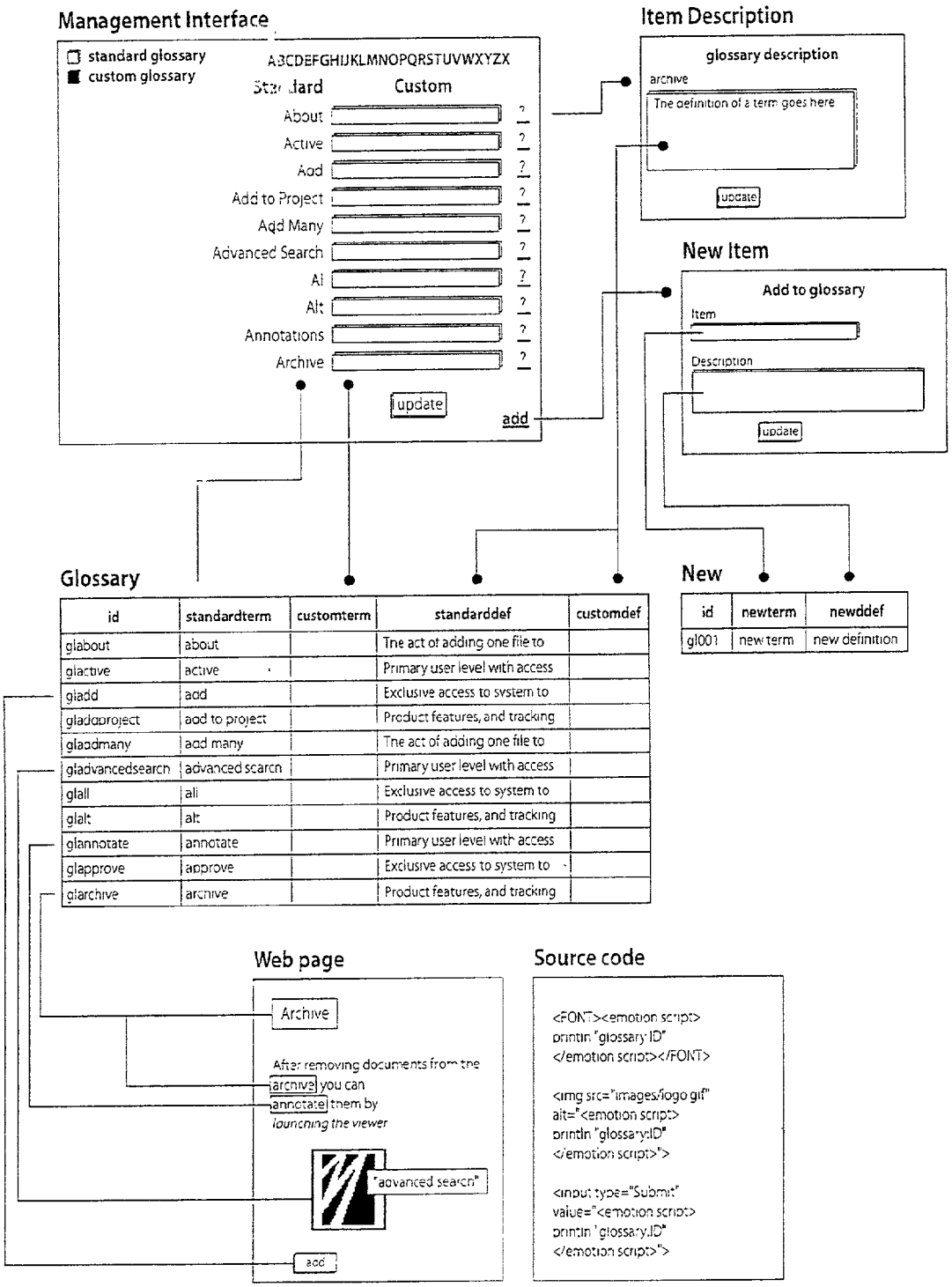
FIG. 2 shows a typical customization interaction screen.

The inventive software manages media files, or assets, making it possible to store and retrieve them, to collaborate with colleagues to edit and work with them, and to deliver them, either for further processing or in finished form for use.

The workflow of the inventive software is designed to provide flexible choices among features that support a creative user who works with rich media files. As soon as a user logs on to the software (an optional step), she can immediately see if any system-internal messages are waiting in her system email inbox, either sent from other users collaborating with her on media files, or sent automatically by the inventive system to notify her of various occurrences that may pertain to her work, such as a project update. The user can read her messages, reply to a message, or compose a new message to send to another system user. A composed message may consist of text only, or it may have a system-internal file attached.

The user may wish to work on a project, such as an advertising campaign. She enters the project work area, and creates a new project. This creates a virtual workspace in the inventive system that is dedicated to holding media files and all their related files, including edited versions, colleague comments, official approvals, and so on. She decides which users will be allowed to share access to the project space. She may upload files that she has already created into the project work area. From there, she can send a media file off to a colleague for comments, editing, or approval.

If she decides to rework a previously created file for use in the new ad campaign, she can search for the file in the file storage area of the inventive system. She enters search terms, generally either by typing or by speaking into an input device, and finds an appropriate media file. She then saves the file to her new project. She may decide, instead, to have the full, high-resolution version of that file sent to her for a different project. In the inventive system, delivery options for high-resolution files include on-line delivery via ftp, http, or special network; via CD delivery, or even via mail delivery of the file in analog format. Ordering and file delivery in the inventive system are subject to several conditions, which the software verifies and tracks. These conditions include whether the user has the proper rights and permissions, not only to view the file but also to use or publish it. If use is subject to a fee, the fee must be paid, whether by billing, credit card, or other means. If usage requires personal approval, the request is routed to the right person and approval is granted and tracked, all within the inventive software system.

Rights management. If a user determines that she needs to use a rights-restricted media file, she must engage in a dialogue with the inventive software about her planned use of the file. Companies can customize sets of questions that the software presents to users, depending on which file a user wants to order. The user may have to answer whether she intends to publish the file, where it will be published, to what size audience, at what location, on what date. The answers determine whether the file can be made available, and can also determine the price. For example, if she is showing ten seconds of a movie for a one-time training seminar in Canada for an audience of fifty people, her cost may be far less than making those same ten seconds of movie available on the home page of a major entertainment Web site. And making the entire movie available on the Web may perhaps not be permitted at any price.

When users order files in the software according to the invention, the rights management process controls every aspect of the order. A company may allow its employees to use its media files for personal use, marketing use, or in an internal organization project. Or they may allow all three uses in different situations. They can track the user's use of the files, they can designate the licensing type for the files and make sure a rights agreement is included, and they can enforce legal or company policy restrictions that may apply. The rights management process helps clients establish all of these elements so they can apply them appropriately to their stored media files.

The invention described here makes it easier for individual clients to customize a rights management setup so that the software will make the right pricing and availability decisions for each projected use. Central to the system is a question-answering paradigm: an administrator or a manager decides what questions should be presented to each potential user of a file, and what set of multiple choice answers to supply. The software maps the questions and answers to a rights and usage package, and, if applicable, each package is assigned pricing.

For example, an administrator may determine that a file's availability depends on:

What department is giving the presentation?
Who is the audience?
Will the image be included in any handouts?
Will the image be displayed on an overhead?
When is the presentation date?
Does the work contain images of any sculpture, painting, drawing, or other art object that may be copyrighted?

The questions, in turn, are grouped appropriately for a company's particular file collections, and are assigned to either groups of files or individual files. Questions and their answers may serve as fundamental criteria for whether a file is made available; they may serve as modifiers to an available file by raising or lowering pricing depending on usage; or they may simply be informational questions that do not play a role in decision-making, but allow companies to track file use and user needs.

The rights management process. When ordering files, users answer questions that ask for information about how they are planning to use the files they order. The questions a user answers are the usage questions a company designates for each possible use. This set of usage questions is called a rights package. Creating a rights package is the first step in the rights management process.

A rights package, or set of questions, is added to other rights packages, to make up a rights package group. This allows a company to make more than one rights package available for a group of files. A rights package group is added to a particular license type. The license type describes the possible ways a file can legally be used. A rights agreement is added to define details clearly about the user's rights. In the final step, the rights agreement is associated with a particular license type through a control table. The control table also contains pricing and approval information for each rights package.

The core piece of this process is the creation and grouping of questions that cover a company's business and legal interests for their stored media file usage. Part of this process is completed with what may be termed a rights package question role editor. A typical editor interaction is shown in FIG. 1.

Glossary Customization Tool and Usability Customization Tool. The software according to the invention incorporates a glossary management tool that makes it easy for each client to customize terminology to the needs of a particular business. With this tool, termed a glossary manager, a company can customize a number of feature names in the system to provide a more familiar context for their users.

The system also includes a usability management tool that customizes the software interface "look and feel" to more closely reflect a company's corporate culture, image, and to reflect the system context within the company. A part of the system termed a usability manager allows a company to change system background colors, fonts, and the embedded logo. This tool also makes localization into a different language simpler. A typical customization interaction screen is shown in FIG. 2.

User-configurable browseable generation. In a typical asset management system, users browse through media file collections and view thumbnail images of files to decide which files they want to work with. These thumbnails are browseables, or small representations of the actual images, videos, or other media files in the system. A browseable is created by optimizing an image or video frame for online browsing, so a browseable has lower resolution and smaller dimensions than the original file. The browseable (the proxy of the actual media file) is what the user sees in the system according to the invention, and browseable size is generally set by a system administrator for use throughout the system. Importantly, the system permits generating these lower-resolution proxy files in a way that can be configured by the customer.

Natural language processing techniques. In the system according to the invention, the natural language processing component is layered. The system architecture supports a conventional search algorithm, which operates as a plug-and-play support application. The algorithm is then used in a word expansion process. The word expansion is applied to both a user's search query, and to the stored files' captions, that is, descriptive metadata identifying individual files.

When a user submits a search query, the query undergoes several types of NLP processing (detailed below), and the result of each element in the processing adds new query components (for example, synonyms) and/or weights (which emphasize or dewords depending on their value to the query). The resulting, or processed, query contains expanded terms and weighting information that can be passed to any search engine. This makes it possible to use multiagent (or "federated search") applications as well.

To expand a user search query, once a user query is received, it is divided into individual tokens, which may consist of single words or multiwords. (Multiwords are words the search engine recognizes as one unit, instead of as separate words. With this feature, when a user searches for sea lions, the system does not bring up lions by the ocean.) For this process, a variation of conventional pattern matching is used. If a single word is recognized as matching a word that is part of a stored multiword, the processor decides whether to treat the single word as part of a multiword, based on the contents of the stored pattern and the input pattern. Stored patterns include not just literal words, but also syntactic categories (such as adjective or nonsemantic categories (such as nationality or government entity), or exact matches. If the input matches the stored pattern information, then it is interpreted as a multiword rather than as independent words.

Processing then determines whether the resulting word is a function word (closed-class) or content word (open-class). The processor ignores function words. For content words, the related concepts for each sense of the word are retrieved from the semantic net. If the root word is unknown, the word is treated as a keyword, requiring an exact match.

The system then matches the expanded, weighted search query with stored media files in order to return search results to the user. Media files are identified by the metadata associated with them, e.g. in a caption. Textfiles can be identified by metadata associated with them, and also by their content. When users import media files into the system, the software provides a workflow to add captions to each file. The files are then uploaded into the database, and the file captions are expanded and the information stored for later file searching.

To expand the file captions, the processor looks up each word in the caption or text. Words that may be related in the semantic net are located based on stored links, and the looked-up word, along with any related words, are all displayed as the "expansion" of that word. The processor determines whether the current word or phrase corresponds to a proper name, a location, or something else. If it corresponds to a name, a name expansion process is invoked that displays the name and related names such as nicknames and other variants, based on a linked name file. If the current word or phrase corresponds to a location, a location expansion process is invoked that accesses a gazetteer and displays the location and related locations based on linked location information found in the gazetteer and supporting files. If the current word or phrase is neither a name nor a location, it is expanded using the semantic net links and weights associated with those links. Strongly related concepts are given high weights, while more remotely related concepts receive lower weights, making them less exact matches. Thus, for a query on car, documents or metadata containing car and automobile are listed highest, followed by those with sedan, coupe, and convertible, and then by more remotely related concepts such as transmission, hood, and trunk.

Once the expansion is complete, the expanded word or phrase is stored in an index database, where it is available for use in searching as described below. Processing then returns to expand the next word or phrase in the text or caption.

The system according to the invention handles certain words and phrases individually. Multiwords are matched as a whole unit, and names and locations are identified and looked up in the separate name and location files. Next, noun phrases and other syntactic units are identified. A part-of-speech tagger uses linguistic and statistical information to tag the parts of speech for sections of the user query. Only words that match by part of speech are considered to match, and if two or more parts of speech are possible for a particular word, it is tagged with both. After tagging, word affixes (i.e. suffixes) are stripped from query words to obtain a word root, using conventional inflectional morphology. If a word in a query is not known, affixes are stripped from the word one by one until a known word is found.

An intermediate query is then formulated to match against the file index database. Texts or captions that match queries are then returned, ranked, and displayed to the user, with those that match best being displayed at the top of the list. In an exemplary system, the searching is implemented by first building a B-tree of ID lists, one for each concept in the text database. The ID lists have an entry for each object whose text contains a reference to a given concept. An entry consists of an object ID and a weight. The object ID provides a unique identifier and is a positive integer assigned when the object is indexed. The weight reflects the relevance of the concept to the object's text, and is also a positive integer.

To add an object to an existing index, the object ID and a weight are inserted into the ID list of every concept that is in any way relevant to the text. For searching, the ID lists of every concept in the query are retrieved and combined as specified by the query. Since ID lists contain IDs with weights in sorted order, determining existence and relevance of a match is simultaneous and fast, using only a small number of processor instructions for each concept-object pair.

Search Technologies. The system allows users to search for media files with many different types of search queries. For example, users may submit search queries by speaking them, typing them, copying them, or drawing them.

The process of locating a particular file in a large archive is a special area for innovation within the inventive software. Files are characterized in several ways. First, they have an identifier, generally similar to a filename, which is unique within the system and makes it possible to link up all the objects related to a file. These can include the actual high-resolution asset, lower-resolution thumbnails or other proxies for browsing, and information about the file, or metadata. Searching can be performed on the file identifier, or it can be performed on the metadata. In the case of metadata searching, it is desirable to offer search alternatives that go beyond the exact matching process involved in a standard keyword search.

Some systems use controlled vocabulary searching as an optimization of keyword searching. Keyword searches simply match exactly on any word in the user's search query that appears in the search target. (In the system according to the invention, the search target is the metadata describing a media file.) The set of potential keywords is quite large (as large as the vocabulary of English, or whatever language(s) are being used). If there are no limitations on the search vocabulary that can be employed, a user can enter a search for puma and fail to find any files captioned as mountain lion or cougar, even though they all refer to the same thing. Controlled vocabulary is an attempt to address this problem, albeit at considerable cost. In a controlled vocabulary retrieval system, cataloguers all agree to use the same terms. In practical terms, this implies that, when cataloguing, they must check their controlled vocabulary lists and be sure not to deviate. Sometimes tools can be built to aid in this process, depending on the size of the controlled vocabulary. Similarly, tools can also be provided to searchers to control their search requests. However, controlled vocabulary systems do not scale beyond a few thousand terms, since it is impractical to look up every word in English for every search. For broader retrieval systems, for faster cataloguing, and for simpler searching, a different approach is superior.

In addition to standard keyword and Boolean searching, the system software incorporates additional advanced technology for locating stored files. Rather than limiting searching to a controlled vocabulary, the system software includes natural language search, which allows cataloguers and users to employ any words in English (or whatever natural language the retrieval system is using).

Natural language search incorporates:
a semantic network of concepts
additional linguistic techniques, including:
phrase matching
derivational morphology, in lieu of stemming
part of speech tagging
name recognition
location recognition User-tunable Search Parameters. The system according to the invention provides a screen for customers to adjust search parameters, to reflect their company use of stored media file collections. This is shown in FIG. 3. While the parameters may themselves be well-known in a searching system, what is emphasized here is that the user (or, more likely, an administrator) can be granted access to such fundamental decisions about search as:

(a) how good a match has to be before it is displayed to the user, e.g. 50%, and (b) how "creative" the search should be, i.e. how much should the search terms be expanded to include more distant synonyms and related terms.

It should be borne in mind that the system according to the invention can be carried out on an internet, meaning an IP-based network, and in particular may be carried out on the Internet, meaning the global IP-based network.

Multimodal Search. Currently, search methods focus on textual input. The current invention incorporates new search techniques, and combines them in novel ways.

Image search is becoming useful in commercial applications. In the system according to the invention, user search input is provided in a new way. Users may wish to select an existing image as example input, so that a search consists of "Give me more images like this." Perhaps even more useful is the ability to select part of an image, analogous with "Give me more like this part." In the system according to the invention, identifying the part may be done in either of two exemplary ways:

1. Touch screen: user touches the screen to identify the portion of the image that feeds into the search.

2. Markup, using pen or other screen drawing metaphor, including through the system media viewer, which is described in more detail below.

addition, search modalities can be combined. This novel approach to search is particularly applicable to multimedia. Examples of combined, or multimodal, searches, include:
voice and text
touch screen and text
drawing and voice
drawing and touch screen
and so on.

Vocabulary Management. Ideally, the semantic net of concepts is quite large and attempts to incorporate every word or term in English (or other language being used for cataloguing and searching). No matter how large the semantic net may be, there will be a periodic need to expand or edit it. New words appear in English periodically, and, although many may be slang and therefore not particularly important in a business context, some will be real new words and will be important enough to include. For example, rollerblading and in-line skating are relatively new terms in English, and depicting those actions is useful in advertising. So the terms need to be added to the semantic net. Semantic net/vocabulary maintenance is generally a manual process, particularly where the user has an existing media library with a thesaurus and vocabulary management process. Such maintenance can also be performed automatically.

To maintain a vocabulary for an information retrieval application that accepts user queries in natural language, a user maintaining a semantic net would track search queries in a query log. From the query log, he would determine which words are actually novel and are candidates to be added to the system vocabulary, by expanding the query log using morphology, and possibly a spell checker and name identifier. The remaining terms that were not matched are the basis of a list for adding terms to the vocabulary.

Tools to manage vocabulary include:

A morphological analyzer. This tool strips off any endings and morphological alterations in a query to find the stem, and checks to see if the stem is in the current vocabulary. If the stem is not, the user doing the maintenance might try:

A spell checker. This tool uses the conventional algorithms to see if the supposedly new word is actually a misspelling of a known word. If it is not a misspelling, the user might try:

A name identifier. This tool checks to see if the supposedly new word is in a name configuration, in that it follows a known first name in the query. If it does, it is added to a candidate name database. If it is riot, it is proposed as a possible new word to be added to the system's vocabulary.

Searching Audio/Video by Timecode Correlation with Search Criteria. Video and audio files can be timecoded, or marked such that the software in which they run can locate a specific frame (for videos) or measure (for audio) at any time. Importantly, the system according to the invention permits searching timemedia, including video and audio files, by combining two search elements. The first is a standard search, including but not limited to natural language search. The second is a time indicator, such as a SMPTE (Society of Motion Picture and Television Engineers) standard timecode. Face recognition is an additional technology that can be used in searching. Face recognition is a subset of the more general technology of object recognition, and indeed techniques described here may extend to additional technologies as well.

The current state of the art in face recognition technology makes it possible to take a manually created, labeled library of faces, and match faces from a video to that library. For example, a user might work with a news video and use a face recognition program to label Nelson Mandela in it. The output of the face recognition program would be a time-coded segment, with start and stop times, of when Nelson Mandela was on camera, with the label "Nelson Mandela" attached to the time codes. While face recognition currently does not achieve 100% precision or recall, it can still be useful. For example, one known system offers a contract rights management capability for films that demands time-coded segments with names attached, and assumes that users will create those manually, so that the correct contract restrictions for each film segment can be attached to the right time codes. Given a small library of the actors in a film, it would be possible to do a fast, automated match-up of time codes and actors, even with imperfect face recognition technology. Selecting the correct actor from forty publicity shots would be much simpler than selecting from among thousands of faces.

Importantly, the system according to the invention carries out the automated creation of the face library. Required elements include time-coded metadata (for example, the voice recognition transcript of a video), and the ability to find the names of people in text. Each time a face and a person's name appear at the same time code, that occurrence is a potential new entry for the face library. A user may run the facematcher for thousands of hours and sift out the recurring matches as the most likely. In this way, a reference library of faces is created, and new material can be catalogued automatically.

The software according to the invention approaches this by using alignment techniques to match up two or more streams of metadata. For example, a broadcast news program may contain closed captioning for the hearing-impaired. It may also contain a separate description of the news footage, probably created manually by the news department. The system according to the invention uses alignment to match the description, which is not time-coded, with the closed captioning, which is time-coded. This process allows the system to add time codes to the non-time-coded stream. The software then uses that new, derived stream (i.e. the description with newly added time codes), and searches for proper names within it. At the same time, using face recognition algorithms on the video stream, the software finds faces. The system tries to match up the faces with the proper names that describe who they are. This matched set provides us with a rough cut of a face (or object) reference library. This is exemplified in FIG. 4.

Face recognition can also be employed to manage the library or archive of media files. Media libraries are assembled over time, often from disparate sources, and may contain multiple copies of a single media file, either with the same metadata or with different metadata. Duplicate detection is therefore an important element of library and archive management, and face recognition (and, more generally, image recognition) can be leveraged to provide that capability. More broadly, for video, scene detection technology can assist in the process of identifying duplicates so that they can be purged from the library.

Clustering and Other Ways to Determine Stored File Usage. Clustering involves combining user search queries in such a way that the searches can be analyzed usefully to provide answers to business questions. Clustering has received considerable attention in document information retrieval (IR) and more recently, in video IR as a means of refining retrieval results based on user preferences or profiles, and to characterize the marketplace. The prior art contains many examples of clustering applied in information retrieval systems, but they all apply to search results returned to users rather than search queries submitted by users. In the system according to the invention, we cluster search queries by topic. We then use that information to adjust the collections of stored files so that the file collections will better meet users' needs.

This system characterizes the information needs of groups (and subgroups) of users, with respect to a collection of media files (e.g. images, videos, sound clips, text, multimedia objects). Some common groupings include:

search queries that brought back no files search queries that brought back no files the user was interested in search queries that lead to expressions of user interest or sales This system applies clustering technology to user-submitted search queries, and to the files retrieved in search results. It also includes:

- machine learning as applied to the above.
- characterizing the information needs over time, by user type, or by other factors.
- methods for reporting file collection needs to interested parties (for example, media suppliers). The system informs a supplier that pictures of earthquakes are selling briskly, or that users keep looking for videos of dance performances but cannot find any.
- methods for adjusting file collections based on the results of the clustering analysis, above.
- novel clustering techniques. These include using a semantic expansion (such as the WordNet hierarchical thesaurus) and phrase identification (such as noun phrase, and name and location identification) as the basis for the clustering.

Before user queries can be analyzed, they must be expanded to a "common denominator". To expand the user search queries, we use natural language techniques. Specifically, we treat each query as if it were metadata within our system, as described in the NLP section, above. Each query is expanded through the application of a semantic net, so that it contains synonyms and related terms. This expansion provides a set of features to which we can apply standard clustering technology.

Obtaining valuable information on user preferences for stored files begins with deciding what information a client wants to understand. The data set can be selected according to various criteria, including:

- queries from a particular subset of users (e.g. registered users, users by industry, new users)
- queries that lead to success (sale or other indication)
- queries that lead to failure A first step is to select the data set on which clustering is to be performed. In an information retrieval (IR) context, clustering can be performed on queries or on assets to be retrieved (documents, images, video, audio, mixed media). A sample query set may include short queries, as is standard on Web searches, long queries, as seen in TREC (U.S. government-sponsored text retrieval conferences), or as produced by QBE (query by example), in which an asset or set of assets are themselves inserted into a query.

A second step is to perform analysis on the queries using, for example, linguistic methods, such as:

- Tokenization: determine word/token boundaries. In English, tokenization mostly coincides with spaces between words, with certain complications (Alzheimer's=1 token vs. she's=2 tokens).
- Morphology or stemming: removed tense and plural markers and other affixes to find the word root.
- Identify names, locations, noun phrases: using a pattern matcher or other methodology, determine words were groupings for special handling. For example, for names, match certain kind of variance; for locations, match subset; for noun phrases, we to complete and headmatches higher than modifier homematches.

A third step is to expand the queries. Ideally, this step includes expansion using a thesaurus or semantic net of synonyms, superand other relationships.

A fourth step is, for each of the terms in each expanded query, assign a weight based on how close that term is to the original query. The exact weighting will vary by application, but the basic understanding is that more closely matching terms are weighted close to 100.

A fifth step is to create a vector for each expanded query. In order to apply a statistical clustering algorithm, we arrange the vectors into a matrix.

A sixth step is to apply a statistical clustering algorithm in order to group similar queries together. A hierarchical or linear clustering strategy may be used, depending on whether the desired clusters are hierarchical or not. Clustering may allow overlap, which means that a query may appear in more than one cluster.

A seventh step is to apply the clustering algorithm until the stopping condition is met, e.g. the desired number of clusters is obtained, or a combination of cluster number and desired distinctiveness of clusters is reached.

An eighth step relates to the clusters. Clusters are most useful to a human observer if they bear useful names that reflect the content. Use a semantic net hierarchy, combined with term frequency in a reference corpus, to identify the lowestterm in the hierarchy that subsumes all the queries.

Folding Popularity Into Rankings. Many information retrieval applications currently incorporate relevance feedback into their judgements of how to rank search results returned to a user. In all cases, however, the past systems utilize explicit user feedback, not implicit feedback. That is, they rank files by requiring a user to indicate what items he is interested in, once a set of items is returned by a search. Importantly, in the system according to the invention, the system discerns implicit popularity rankings based on a ranked set of user actions. The system then then uses those rankings to resubsequent search results. The user actions from which popularity may be determined include, but are not limited to:

- whether a file is placed in a projects folder or other work space
- whether a file is placed in a shopping cart
- whether a file is purchased In addition, implicit popularity rankings may be derived from one user or set of users and applied to a different user or set of users. For example, if User A places a media file in a projects folder or shopping cart, the information on her activity can also be used to research results for User B, who is in some way similar to user A. In another example, if users with ".edu" e-mail addresses buy certain things, it makes sense to research results to favor those things when showing results to other ".edu" users. In the system according to the invention, if registered users who work for advertising agencies have placed certain items in their shopping carts, other advertising agency employees can have their search results re-ranked to favor those items. The opposite can be true as well: the same system can be used to disfavor certain items because they have been sold too many times to advertising agencies, for example.

Retrieval system self-evaluation. The retrieval system according to the invention does not answer any of the TREC tracks—a media file is described by a short paragraph or by keywords. Even though it is possible to develop a unique test collection for purposes of evaluation, it will not necessarily predict the performance of new systems, or even for existing ones.

What is now described is a method for ongoing evaluation of IR system performance based on search results combined with user feedback. This approach enables the system to alert a human system manager about observed degradation in the system performance. As the performance evaluation system becomes more knowledgeable through methods of machine learning, the system is desirably able to change its own parameters in order to improve its performance.

"Performance" as used in this inventive system is a score on a scale of user satisfaction with the respect to search results rankings. User satisfaction is determined by tracking the user actions together with the system's data. For example, for a very good performance, the user would submit a search query and purchase the media file that was ranked first. Possible indications of poor performance might include a user issuing several consecutive queries, getting thousands of results, and terminating the session without further examining any of the media files.

Figures 4, 5:
FIG. 4 shows a sample of a face-matching system according to the invention.
FIG. 5 illustrates a viewer according to the invention with text annotation box.

Viewer. The software application according to the invention includes a viewer for annotations, or mark-ups, of full motion digital still images, video frames, or other indexed data structures. The viewer, preferably accessible on a personal computer with a Web browser, serves as a helper application for the underlying application of the system according to the invention. The viewer allows users to view and mark up (comment on) media on a separate, see-through lightweight layer. The viewer supports annotations that are created and rendered so that they appear overlaid on the related media. Position, size, frame number, and other attributes of annotations are saved in a separate annotation file, and when played back the annotations appear at the saved location and with the saved attributes. Preferably, to the greatest extent possible, creating and editing of annotations is be done in WYSIWYG (what you see is what you get) fashion. This is illustrated in FIG. 5.

The annotations may consist of text, graphics, and digitized audio, and are stored separately from the original file information. An indexing scheme relates individual annotations to individual video frames. On full motion video playback, the annotations are displayed on the originally annotated frames. One central part of the system according to the invention is the use of a downloadable, view-only application, which enables users who do not have the full power to create annotations nonetheless to be able to view annotations created by others.

In an exemplary embodiment, files are stored centrally. Preferably the viewer provides security, e.g. SSL, server authentication, and proxy authentication. The underlying application according to the invention powers the full lifecycle of digital media from content collaboration, deep storage, search and retrieval using a natural language search and the ability effectively to move bandwidth-intensive media over the Web. The software is preferably Web-based.

The viewer is a standalone, platform "helper" application that is normally launched by a Web browser, from a specific link on a Web page that is part of the Web server of the system according to the invention. The viewer has the ability to upload annotation data back to the Web server. Except for the two actions of launching and uploading, the viewer does not require any network connection with the Web server or the Web browser.

The current viewer in the system according to the invention on a PC or Macintosh platform allows the user to view and annotate various video, still image, audio, and text formats, including MPEG, QuickTime, or RealMedia videos, bitmap, jpeg, and tiff images, MP3, .wav, .aiff, .au, and .snd audio files, and .pdf document files. The viewer currently has nine modes in which it can operate, all of which would be relevant to the mobile user. They are:

annotate a media file
select a keyframe
select storyboard frames (and optionally a keyframe)
set the download (cache) directory
send a message and, optionally, attached files to another user
download a media file
upload media files to a project
upload media files to a public collection
select a playlist The current (Mac and Windows) viewers can be launched in any of these nine modes, generally by receiving an XML annotation file.

Attributes common to all annotation types are: position, size, frame number (video only), and page number (multi-page document only). All of the graphical attributes such as colors and fonts are modifiable using platform-native dialog boxes. These attributes can be set for new annotations as well as previously created ones.

For video, each annotation is recorded with the timecode of the specific frame on which it was created. When movies with annotations are played back, the viewer stops playback at each frame where an annotation exists. The viewer also contains a droplist of all annotated frames (by timecode) so that individual annotated frames can be viewed quickly. Controls are also provided for stepping by a single frame in either direction, as well as a control displaying the timecode of the current frame where the viewer is paused.

PDA (or handheld or wearable) version of the viewer builds on the same general architecture. The server generates a simple XML annotations file, sends it to the client (i.e. the viewer via the Web browser), and handles the returned HTTP messages from the viewer.

The following annotation types are desirably supported on a PDA version: [t1]

Annotation Types

| Type | Attributes |
| --- | --- |
| Freehand drawing (pen) | Line width, Color |
| Transparent text | Font name, Font size, Font color |
| Sticky note | Font name, Font size, Font color, Background color |
| Sound | Audio data |

In this way, the system according to the invention supports the full life cycle of media; allowing organizations to expedite the process of searching, collaborating and distributing of digital assets, such as imagery, video files, pictures and text documents. Users desirably have the freedom to collaborate anywhere at anytime using the annotation viewer according to the invention on a PDA. Users are preferably able to annotate video and still images with a virtual pen, sticky note, text and even voice using a wireless modem. Annotations are preferably capable of being added, edited, moved, or deleted.

A PDA-based digital media management solution takes digital delivery and collaboration to the next level by eliminating the need of a traditional PC and Ethernet connection. In addition, users no longer need to carry laptops to stay up to date on work involving video or still images.

Preferably the viewer supports both HTTP authentication and Proxy authentication. As an option, the viewer displays a login dialog where the user can enter a user ID and password to be used for authentication. Since the viewer is activated and closed frequently, it should not prompt the user to log in each time it connects to the server. The viewer instead provides a mechanism for saving the user ID and password on the local workstation (in encrypted form) and passing this information to the server without any prompting. It is desirable that the viewer support SSL encryption for all of its HTTP requests.

The invention claimed is:

1. A method for use with a system storing a myriad of digital media files, the method comprising the steps of:
generating a myriad of first thumbnail images, each first thumbnail image corresponding to one of the digital media files, each first thumbnail image having lower resolution and smaller dimensions than the corresponding digital media file, each first thumbnail image having first dimensions;
displaying a subset of the first thumbnail images, the subset comprising more than one and less than all of the myriad of first thumbnail images, the subset created as a result of input from a first user;
receiving a configuration command from a second user, the configuration command indicative of second dimensions differing from the first dimensions;
generating a myriad of second thumbnail images based on the configuration command from the second user, each second thumbnail image corresponding to one of the digital media, each second thumbnail image having lower resolution and smaller dimensions than the corresponding digital media file, each second thumbnail image having second dimensions; and
displaying a subset of the second thumbnail images, the subset comprising more than one and less than all of the myriad of second thumbnail images, the subset created as a result of input from a third user.

2. The method of claim 1 wherein the first and third users are the same user.

3. The method of claim 1 wherein the first and third users are different users.

4. A method for use with a system storing a myriad of digital media files, the method comprising the steps of:
generating a myriad of first thumbnail images, each first thumbnail image corresponding to one of the digital media files, each first thumbnail image having lower resolution and smaller dimensions than the corresponding digital media file, each first thumbnail image having a first resolution;
displaying a subset of the first thumbnail images, the subset comprising more than one and less than all of the myriad of first thumbnail images, the subset created as a result of input from a first user;
receiving a configuration command from a second user, the configuration command indicative of second resolution differing from the first resolution;
generating a myriad of second thumbnail images based on the received configuration command, each second thumbnail image corresponding to one of the digital media files, each second thumbnail image having lower resolution and smaller dimensions than the corresponding digital media file, each second thumbnail image having second resolution; and
displaying a subset of the second thumbnail images, the subset comprising more than one and less than all of the myriad of second thumbnail images, the subset created as a result of input from a third user.

5. The method of claim 4 wherein the first and third users are the same user.

6. The method of claim 4 wherein the first and third users are different users.

7. A method for use with a system storing a digital media file, the method comprising the steps of:
generating a thumbnail image corresponding to the digital media file based on a first configuration from a first user, the first configuration indicative of a first size of the thumbnail image, wherein the first size is at least one of resolution or dimension;
based on a query from a second user, performing an information retrieval search to locate and retrieve the thumbnail image;
receiving a second configuration from the second user, the second configuration indicative of a second size differing from the first size;
changing the thumbnail image to the second size based on the second configuration received from the second user;
displaying a subset of the second thumbnail images, the subset comprising more than one and less then all of the myriad of second thumbnail images, the subset created as a result of input from a third user.

8. The method of claim 7, wherein performing the information retrieval search further comprises:
displaying the thumbnail image as part of a search result, wherein the query is for information associated with the digital media file.

9. The method of claim 7, wherein performing the information retrieval search further comprises:
clustering the thumbnail image with at least another thumbnail image based at least on a similarity between metadata associated with the thumbnail image and the at least another thumbnail image.

10. The method of claim 7, wherein performing the information retrieval search further comprises:
identifying the thumbnail image and at least another thumbnail image as duplicates to be purged based at least on face recognition, image recognition, or scene detection.

11. The method of claim 7, further comprising displaying the changed thumbnail image, in response to changing the thumbnail image.

* * * * *

UNITED STATES PATENT AND TRADEMARK OFFICE
CERTIFICATE OF CORRECTION

| | | |
|---|---|---|
| PATENT NO. | : 7,177,879 B2 | |
| APPLICATION NO. | : 10/063410 | |
| DATED | : February 13, 2007 | |
| INVENTOR(S) | : Flank et al. | |

It is certified that error appears in the above-identified patent and that said Letters Patent is hereby corrected as shown below:

On the title page, in field (75), in "Inventors", in column 1, line 2, delete "Washington, DC" and insert -- Reston, VA --, therefor.

In column 8, line 52, delete "addition," and insert -- In addition, --, therefor.

In column 9, line 32, after "If it is" delete "riot," and insert -- not, --, therefor.

In column 12, line 28, after "system then" delete "then".

Signed and Sealed this

Tenth Day of April, 2007

JON W. DUDAS
*Director of the United States Patent and Trademark Office*